United States Patent [19]

Dabringhaus et al.

[11] Patent Number: 5,144,963
[45] Date of Patent: Sep. 8, 1992

[54] ASHTRAY, STORAGE COMPARTMENT OR THE LIKE, PARTICULARLY FOR AUTOMOTIVE VEHICLES

[75] Inventors: Volker Dabringhaus; Peter Wegel, both of Wuppertal, Fed. Rep. of Germany

[73] Assignee: Gebr. Happich Gmbh, Fed. Rep. of Germany

[21] Appl. No.: 793,820

[22] Filed: Nov. 18, 1991

[30] Foreign Application Priority Data

Nov. 30, 1990 [DE] Fed. Rep. of Germany ....... 4038324

[51] Int. Cl.$^5$ .................... A24F 19/00; A24F 19/06
[52] U.S. Cl. .................................. 131/231; 131/242
[58] Field of Search .................. 131/231, 240.1, 241, 131/242; 220/331, 345-349; 224/278

[56] References Cited

U.S. PATENT DOCUMENTS

| 3,677,396 | 7/1972 | Staar . | |
|---|---|---|---|
| 3,836,222 | 9/1974 | Kuntze . | |
| 4,113,091 | 9/1978 | Ackeret . | |
| 4,676,544 | 6/1987 | Dabringhaus et al. | 131/231 X |
| 4,693,364 | 9/1987 | Wakelin | 220/331 X |
| 4,765,346 | 8/1988 | Simin | 131/231 |
| 4,830,026 | 5/1989 | Yokokawa | 131/231 |

FOREIGN PATENT DOCUMENTS

| 3602197 | 7/1987 | Fed. Rep. of Germany | 131/231 |
|---|---|---|---|
| 3930271 | 3/1991 | Fed. Rep. of Germany . | |

Primary Examiner—V. Millin
Assistant Examiner—J. Doyle
Attorney, Agent, or Firm—Ostrolenk, Faber, Gerb & Soffen

[57] ABSTRACT

An ashtray or the like storage container, which is intended particularly for automotive vehicles, includes a housing with a recess in it and a housing insert which is pivotable into and out of the housing recess. A detent arrangement for holding the housing insert in the closed position in the housing recess includes the housing insert having a cardioid shape control curve guide groove defined on it. A lever articulatedly attached in the side wall of the housing recess includes a pin which sits in the guide groove and rides along the upper and lower parts of the groove as the housing insert is moved into and out of the housing recess. The front side of the groove has a depression in which the pin on the lever is seated to prevent the housing insert from opening out of the housing recess. The housing insert is released from the recess when the front side of the insert is pressed in, which pivots the articulated lever and the pin to move the pin into the first part of the guide groove. To improve its operation, the lever has a spring in the form of an integral tongue cut out of the lever and which is normally self biased against the housing side wall. The tongue prevents the lever and the pin from shifting during normal bouncing of the vehicle. The root of the spring is toward the pin that follows the control curve guide groove.

12 Claims, 2 Drawing Sheets

1

ASHTRAY, STORAGE COMPARTMENT OR THE LIKE, PARTICULARLY FOR AUTOMOTIVE VEHICLES

BACKGROUND OF THE INVENTION

The present invention relates to an ashtray, storage compartment, or the like, particularly for automotive vehicles, having a stationary housing and a housing insert in the housing and which is spring urged in the opening direction and out of the housing, and having disengagable detent means for holding the housing insert in the closed position in the housing. The detent means can be actuated by pressing in on the front plate of the housing insert. The detent means has a cardioid shape control and guide curve which is developed as a slide groove on and which therefore moves with the housing insert. A pin which is arranged on an articulated lever at the side of the housing rests in an engagable manner in the cardioid curve slide groove.

Ashtrays of this type are known. They are enjoy increasing popularity due to their easy and simple use, i.e. they may be automatically tilted. In such ashtrays, as shown in Federal Republic of Germany OS 39 30 271, a two step directional lock, like that known from a ball point pen mechanism, is generally used as the detent means.

Conventional detent means have not always proven suitable in practical use and have given rise to objections. For instance, the housing insert frequently is not held in its closed position in the housing. From examinations and investigations of its function, it was recognized that the pin seated on the articulated lever does not reliably enter the correct branch of the control curve unless the articulated lever remains in a precisely predetermined position. Attempts to produce self locking in the region of the support of the articulated lever or to effect clamping of the lever against the housing by bosses on the articulated lever have not led to any lasting improvement in the operation.

SUMMARY OF THE INVENTION

The object of the present invention is to attain permanent reliable operability of the detent means in the case of an ashtray, storage compartment, or similar container of the aforementioned type.

According to the invention, the articulated lever is articulately supported to and is swingable with reference to the housing wall which is just outside the housing insert. The lever has a spring element which rests against the housing wall adjacent to it. This prevents undesired shifting of the lever. The spring element is developed in one piece with and is comprised of the same material as the articulated lever. In particular, the spring element is comprised of a spring tongue which is defined by a cutout in the articulated lever. The tongue extends in a direction that coincides with the longitudinal axis of the articulated lever. The tongue has a root at which it is attached to the articulated lever. The tongue has a side projection which is arranged on the free end of and that extends out of the plane of the articulated lever and presses against the adjacent housing wall.

The spring element on the articulated lever self locks it, which assures that it retains its predetermined position. On the other hand, easy, essentially cam path directed sliding of the articulated lever is obtained when the pin seated thereon passes around the control curve. Thus, the invention surprisingly simultaneously satisfies two contradictory requirements, namely self locking on the one hand and easy sliding on the other hand. The spring element, furthermore, also compensates for tolerances and is produced without increased expense since it is of one piece with and of the same material as the articulated lever. This is especially the case when the articulated lever, together with the spring tongue, are developed as a plastic injection molding. Tests have shown that the life of the spring element is practically unlimited, and the ability of the articulated lever to remain in position and its ease of movement remain unchanged for a long time.

Other objects and features of the invention are apparent from one embodiment of the invention which is described below with reference to the drawings.

DESCRIPTION OF THE PREFERRED EMBODIMENT

Figure 1:
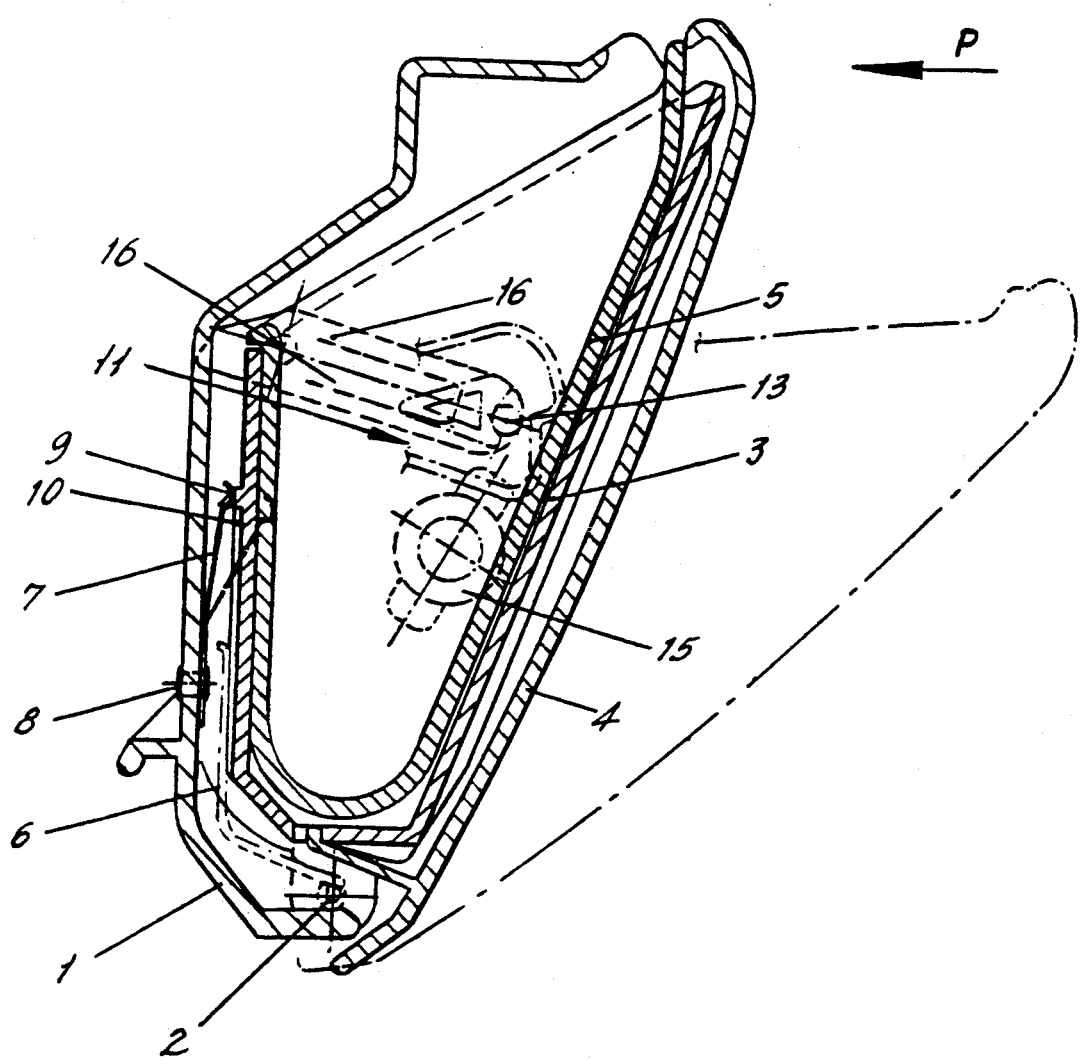
FIG. 1 is a vertical section through an automobile ashtray of the invention.

The invention is shown for use with an automobile ashtray. But it is useful for other containers which include a housing insert that moves into or out of a housing, such as storage compartments, coin boxes, glove compartments, and the like. Furthermore, the ashtray shown is a tilt type, but it could also be developed for a pull type ashtray.

The ashtray includes a housing 1 with a recess into it and includes a housing insert 3 that is supported in the recess of the housing 1 and is swingable around a pivot pin 2, which is located toward the bottom of the housing and extends parallel to the front of the ashtray. The housing insert has a front plate 4 which is part of and opens and closes with an ash container 5 that is behind the front plate.

A leaf type opening spring 6 is located behind the housing insert in the recess and acts against the rear wall 10 of the housing insert 3 to normally push the insert to swing out of the recess.

An additional spring 7 is arranged on a stationary housing wall behind the housing insert in the recess, where the spring is fastened by a rivet 8. One spring arm 9 of the additional spring 7 acts against the rear wall 10 of the housing insert 3. The closed position of non-use of the insert 3 and of the spring arm 9 is shown in solid lines in FIG. 1, while its open position of use is indicated by dash-dot lines. The spring 7 augments the operation of the spring 6 and has a more limited range. The primary purpose of the spring 7 is to prevent the housing insert 3 from unintentionally opening out of the housing recess. While the insert 3 is closed in the housing recess, the main spring 6 biases the front wall 32 of the front part 31 of the slide control guide groove 12 against the pin 13, as described below, which keeps the insert 3 closed. When the vehicle shakes heavily, the spring 6 may not be strong enough to keep the ashtray closed through engagement of the pin 13 in the guide groove depression 14, as described below. The auxiliary spring 7 increases the closing force on the insert.

To bring the housing insert 3 into the tilted outward position of use, it is first pushed slightly into the housing in the direction of arrow P, which releases the securement of the housing insert 3 in the housing recess by the below described detent means 11. This frees the housing insert 3 to be moved outward by the opening spring 6 into the position of use, in the direction opposite the direction it was pushed.

The lock or 11 detent means is a directional lock arranged on a side wall of the housing insert 3 and is, for example, a type known from a ballpoint pen mechanism. The detent means 11 includes a pin 13 on an articulated lever 16 and the lever is supported on a wall which defines the housing recess. The pin is guided for sliding movement along a generally cardioid shaped guide groove 12 on the side of the housing insert 3. In its locked position with the insert 3 into the housing 1, the pin 13 sits in a depression 14 developed at the outward or forward facing rear wall 33 of the front part 31 of the guide groove 12.

The pin 13 is supported at an end of the articulated lever 16. The other end of the lever 16 is articulatedly held on the housing 1. The pin 13 is forced on the one hand by the opening spring 6 and on the other hand by the additional spring 7 into the depression 14 along the detent means groove 12 so that the slight pushing of the housing insert 3 into the housing 1 takes place against the force of those two springs and so that shaking of the vehicle will not pop open the insert 3.

After the housing insert 3 is pushed inward, the pin 13, which remains stationary as the insert temporarily moves inward, slides out of the hollow depression or recess 14 and into the lower part or branch 17 of the groove guide 12. How the pin 13 is reliably guided into the lower part 17 is described below. The entry of the pin into the lower part 17 of the groove frees the housing insert 3 to be opened under the normal bias of the opening spring 6. In order that the now opened housing insert 3 may be closed and also that it will be held in the closed position by the detent means 11, the pin 13 of the articulated lever 16 must enter the upper branch or part 18 of the groove guide 11, or the pin cannot thereafter be guided to move into the depression 14 again. The correct path for the pin 13 is established by the control curve guide groove 12 which positions the articulated lever 16 as the insert 3 moves in and out of the housing. See the description of the motion below.

The predetermined position of the articulated lever 16 must not change while the housing insert 3 is in the open condition out of the housing recess, or the pin 13 would then travel into the wrong branch or part of the guide groove 12 which would prevent the housing insert 3 from being held in the closed position.

Figure 3:
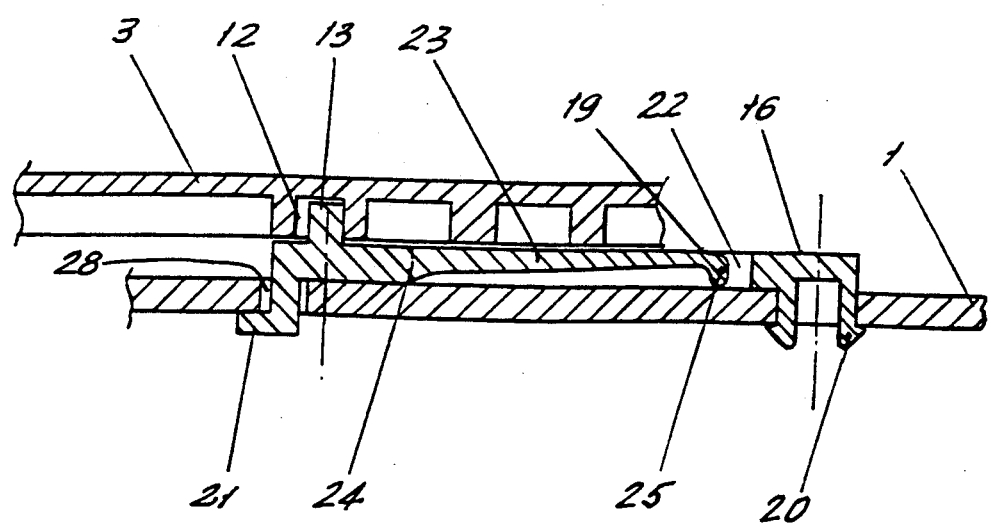
FIG. 3 is a section along the line III—III of FIG. 2.

To ensure that the articulated lever 16 remains in its predetermined position which is set only by the position of the pin 13 along the guide groove 12, even in the event of bouncing or strong vibration of the automobile, the lever 16 is provided with a spring element 19 which rests against the stationary housing wall adjacent to it (FIG. 3).

The articulated lever 16 is formed from an elongate, relatively thin, plastic plate. At one end, it has a journal pin 20 which is developed as a clip which is pivotably held in an opening in the housing wall in the housing recess and near to the detent means 11. On its other end, the lever 16 has a guide tongue 21 which passes through a slot 28 in the housing wall. The tongue is shaped with a tip so as to be held at the housing wall. The slot 28 is arcuately curved around the axis of the pin 20 which enables the pin 13 to follow the cardioid path of the guide groove 12.

On the opposite side of the lever 16 from the guide tongue 21, the cam following pin 13 is formed on the lever 16. A U-shaped cutout 22 in the lever 16 defines a spring tongue 23. The root 23 of the tongue 24 is near the lever guide tongue 21 and the pin 13. The spring tongue 23 tapers down in thickness from its root 24 toward its free end. The free end of the tongue has a slide projection or boss 25 which presses against the adjacent wall defining the recess in the housing 1. The tongue is bent out of the plane of the lever 16 toward the housing recess wall and is biased against the wall. The spring tongue 23 has a soft spring characteristic so that the boss 25 can easily slide over the housing wall as the pin 13 moves the lever 16. On the other hand, the articulated lever 16 and therefore the pin 13 remain self locked at every sliding position of the lever 16 along the housing recess wall, particularly as the spring pressure of the spring tongue 23 acts close to the journal pin 20. The fact that the pin 13 is held stationary with reference to the wall of the housing recess at every position at which the pin 13 is not being guided along the slot 12 by the guide groove 28 is important to assured movement of the pin 13 through the guide groove 12.

The path followed by the pin 13 and the control over the initial opening of the housing insert out of the housing and the subsequent reclosing and relocking of the insert into the housing is now described. The groove 12 includes not only the lower part 17 and the upper part 18, but it includes the front or forward facing part 31 and the opposite rear end part 32, with reference to the front of the housing and the insert. When the front 4 of the housing insert 3 is first pushed inward against the bias of the springs 6 and 7, the outward wall 32 of the front part of the groove 31 moves toward the pin 13 while the rearward wall 33 of the front part 31 moves rearwardly away from the pin 13. The front wall 32 has its cardioid shape apex 34 above the pin 13 then in the depression 14 and the forwardly oblique slope of the front wall 32 moves the pin 13 down along the slot 28 and into the lower part 17 of the guide groove 12. The spring 19, 23 holds the lever 16 and the pin 13 stationary where they have been guided by the groove front wall 32. As the push against the front 4 of the housing insert 3 is released, the housing insert carrying the guide groove 12, and particularly the lower part 17 of the guide groove, slides forward past the pin 13 which moves toward the rear 32 of the guide groove. Except as the bottom part 17 of the guide groove 12 guides the pin 13, the pin remains stationary along the arcuate slot 28 as the guide groove 12 moves forward.

The pin 13 always travels through the upper part 18 of the guide groove 12 upon the return, and reclosing motion of the housing insert in the direction of arrow P.

Figure 2:
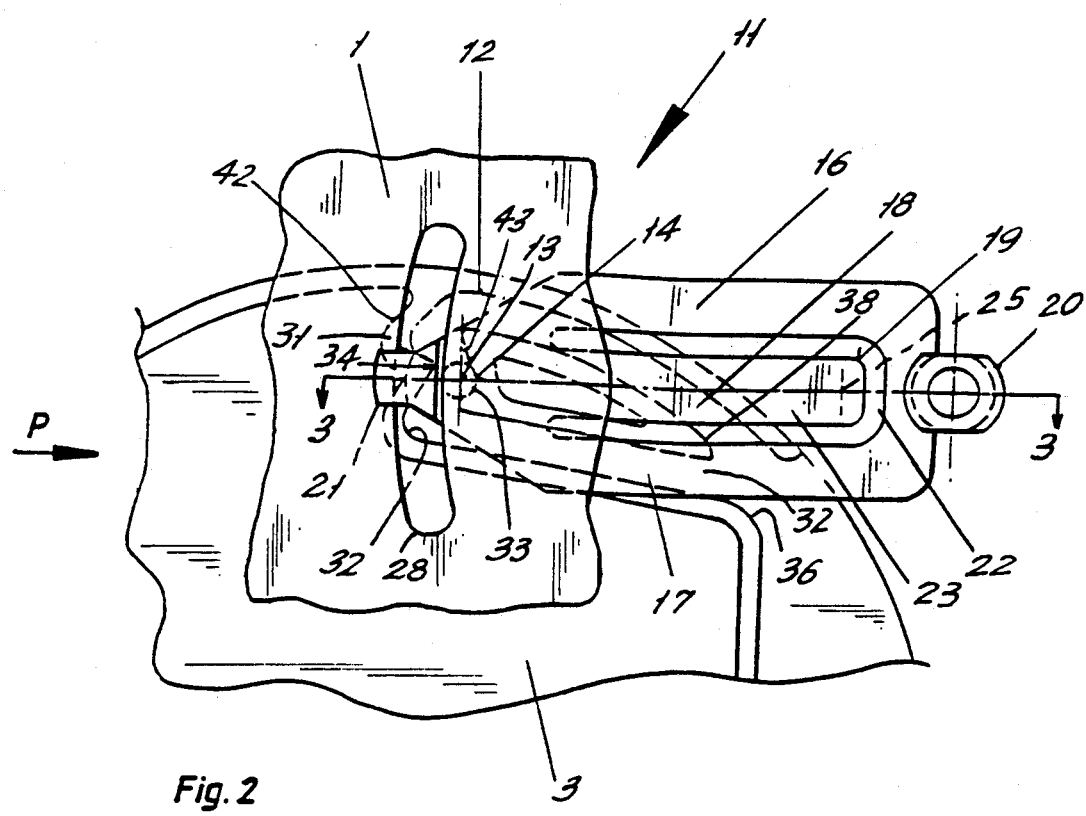
FIG. 2 shows the detent means for the ashtray of FIG. 1.

The rear part 36 of the lower wall of the lower part 17 of the guide groove 12 raises the pin 13 slightly as the housing insert pivots forward. This occurs because the rear portion 36 of the bottom wall of the guide groove part 17 also has a pivoting motion around the pivot axis 2, so that it moves up with reference to the pin 13 as well as moving outward from the housing recess. The raised pin 13 is positioned high enough along the arcuate slot 28 for the pin to enter the upper part 18 of the guide groove as the housing insert is returned, by clockwise pivoting in FIG. 2, into the housing recess. The pin 13 accordingly rides onto the rear end of the bottom side 38 of the upper part 18 of the groove 12 until the insert has moved inwardly so that the pin 13 is at the front part 31 of the groove 12 but above the recess 14.

Continued pushing inward on the housing insert causes the upper front wall 42 of the front part 31 of the guide groove to engage the pin 13 and move the pin downward toward where it can enter the depression 14. When the pushing force is released from the front of the housing insert, the springs 6 and 7 force the housing insert 3 outwardly and the rear wall 43 of the front part 31 of the guide groove completes the pushing of the pin 13 into the depression 14. It is the release of the front of the housing insert following its pushing inward that completes the urging of the pin 13 into the recess 14 in view of the cardioid shape of the guide groove. In view of the above, the pin reliably follows the course defined by the cardioid shaped guide groove 12.

Insert 3 is now securely held in the depression 14 by the springs 6 and 7 and also by the resistance to any movement of the lever 16 and the pin 13 caused by the spring 19, 23, regardless of the normally experienced vibration and shaking of the vehicle. With the pin 13 in the depression 14, force now applied to the front of the housing insert causes the front wall 32 of the front part 31 of the guide groove to again force the pin 13 out of the depression 14 to start releasing the housing insert from its closed position.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A container comprising
   a housing having a recess defined by a side wall of the recess in the housing, the recess having a front side, a housing insert in the housing recess, and means supporting the housing insert for selective movement into and out of the front side of the housing recess;
   detent means at the housing recess side wall and at the housing insert for selectively holding the housing insert in the closed position in the recess and enabling the housing insert to open out of the housing recess, the detent means comprising:
   a control curve on the housing insert, the control curve being in the form of a slide and guide groove open toward the housing side wall, the curve including a front side in the direction toward the front side of the housing recess and the front side of the control curve guide groove including a depression inward from the front side of the recess for receiving a pin;
   an articulated lever articulatedly connected to the housing side wall at an articulation pivot; a pin on the lever located spaced away from the articulation pivot, the pin being received in the groove of the control curve so that as the insert moves with respect to the housing, the pin moves through the control curve groove and the lever articulates around the pivot; the pin and the control curve groove being so shaped that with the pin in the depression at the front side of the control curve guide groove, the pin on the lever engages the control curve guide groove in the housing insert and that engagement blocks opening of the housing insert out of the front side of the housing recess;
   the control curve guide groove having a first part into which the pin is moved from the depression when the housing insert is temporarily pushed further into the housing recess, the groove first part being shaped to avoid interference between the pin and the housing insert and to permit the housing insert to be opened out of the front side of the housing recess with the pin moving through the first part of the control curve guide groove;
   the control curve guide groove having a second part through which the pin is moved as the housing insert is moved into the housing recess; at the front side of the control curve guide groove, the first and second parts of the control curve guide groove being spaced apart with the depression being between them such that the pin moves from the second part and into the depression upon the insert being closed into the housing recess;
   a spring on the articulated lever and resting against the housing side wall which is generally adjacent the lever, the spring comprising a spring tongue defined in the lever and the tongue extending in a direction generally coinciding with the longitudinal axis of the lever, the tongue having a root which is attached to the lever, the root being on the end of the tongue away from the articulation axis of the lever and generally near to the pin on the lever; the tongue having an opposite free end which is toward the articulation axis of the lever, the free end being shaped to rest against and being self biased against the housing side wall for resisting articulating motion of the articulated lever.

2. The container of claim 1, wherein the spring on the lever is of a single piece with and of the same material as the lever.

3. The container of claim 2, wherein the articulated lever has a cut out therein which defines the spring tongue.

4. The container of claim 2, wherein the control curve guide groove is cardioid shaped including the first part below, the second part above and the front side of the groove including the depression joining the first and the second parts of the groove.

5. The container of claim 1, wherein the control curve guide groove is cardioid shaped including the first part below, the second part above and the front side of the groove including the depression joining the first and the second parts of the groove.

6. The container of claim 1, further comprising the free end of the spring tongue protruding out of the plane of the lever and toward the housing side wall for engaging the housing side wall.

7. The container of claim 1, wherein the root of the spring tongue is adjacent to the pin on the lever.

8. The container of claim 1, further comprising a spring normally urging the housing insert out of the housing recess.

9. The container of claim 8, wherein the housing insert is pivotably supported in the housing recess on a pivot axis and the insert is pivotable into and out of the housing recess, the control curve guide groove and the articulated lever being spaced away from the pivot attachment of the housing insert to the housing.

10. The container of claim 8, wherein the insert includes a front plate, which is contactable for urging the insert into the housing.

11. The container of claim 1, wherein the insert is pivotably supported in the housing recess on a pivot axis and the insert is pivotable into and out of the housing recess, the control curve and the articulated lever being spaced away from the pivot attachment of the housing insert to the housing.

12. The container of claim 11, wherein the insert includes a front plate, which is contactable for urging the insert into the housing.

* * * * *